United States Patent [19]

Edakubo et al.

[11] Patent Number: 4,688,102
[45] Date of Patent: Aug. 18, 1987

[54] COLOR VIDEO SIGNAL MIXING SYSTEM

[75] Inventors: Hiroo Edakubo, Tokyo; Kenichi Nagasawa, Kanagawa, both of Japan

[73] Assignee: Canon Kabushiki Kaisha

[21] Appl. No.: 550,486

[22] Filed: Nov. 9, 1983

[30] Foreign Application Priority Data

Nov. 11, 1982 [JP]  Japan .................................. 57-197937
Nov. 24, 1982 [JP]  Japan .................................. 57-205874

[51] Int. Cl.⁴ .............................................. H04N 9/79
[52] U.S. Cl. ...................................... 358/310; 358/31; 358/327
[58] Field of Search .................. 358/30, 31, 310, 330, 358/327, 328, 329, 313, 314, 311

[56] References Cited

U.S. PATENT DOCUMENTS

| Re. 29,975 | 4/1979 | Ishigaki | 358/329 |
| 3,798,357 | 3/1974 | Narahara | 358/330 |
| 3,875,584 | 4/1975 | Fletcher | 358/327 |
| 4,307,413 | 12/1981 | Takeuchi | 358/31 |
| 4,426,666 | 1/1984 | Kobayashi | 360/64 |

*Primary Examiner*—Alan Faber
*Attorney, Agent, or Firm*—Toren, McGeady & Associates

[57] ABSTRACT

A color video signal mixing system wherein a first separating arrangement separates a first luminance signal from a first color video signal; a second separating arrangement separates a first chrominance signal from the first color video signal; a third separating arrangement separates a second luminance signal from a second color video signal; and a fourth separating arrangement separates a second chrominance signal from the second color video signal. A first mixing arrangement produces a mixed luminance signal from the first and second luminance signal; a selecting device selects one of the first and second chrominance signals; a control facility controls the selecting action of the selecting device; and a second mixing arrangement produces a mixed color signal by mixing the mixed luminance signal and the selected chrominance signal.

21 Claims, 14 Drawing Figures

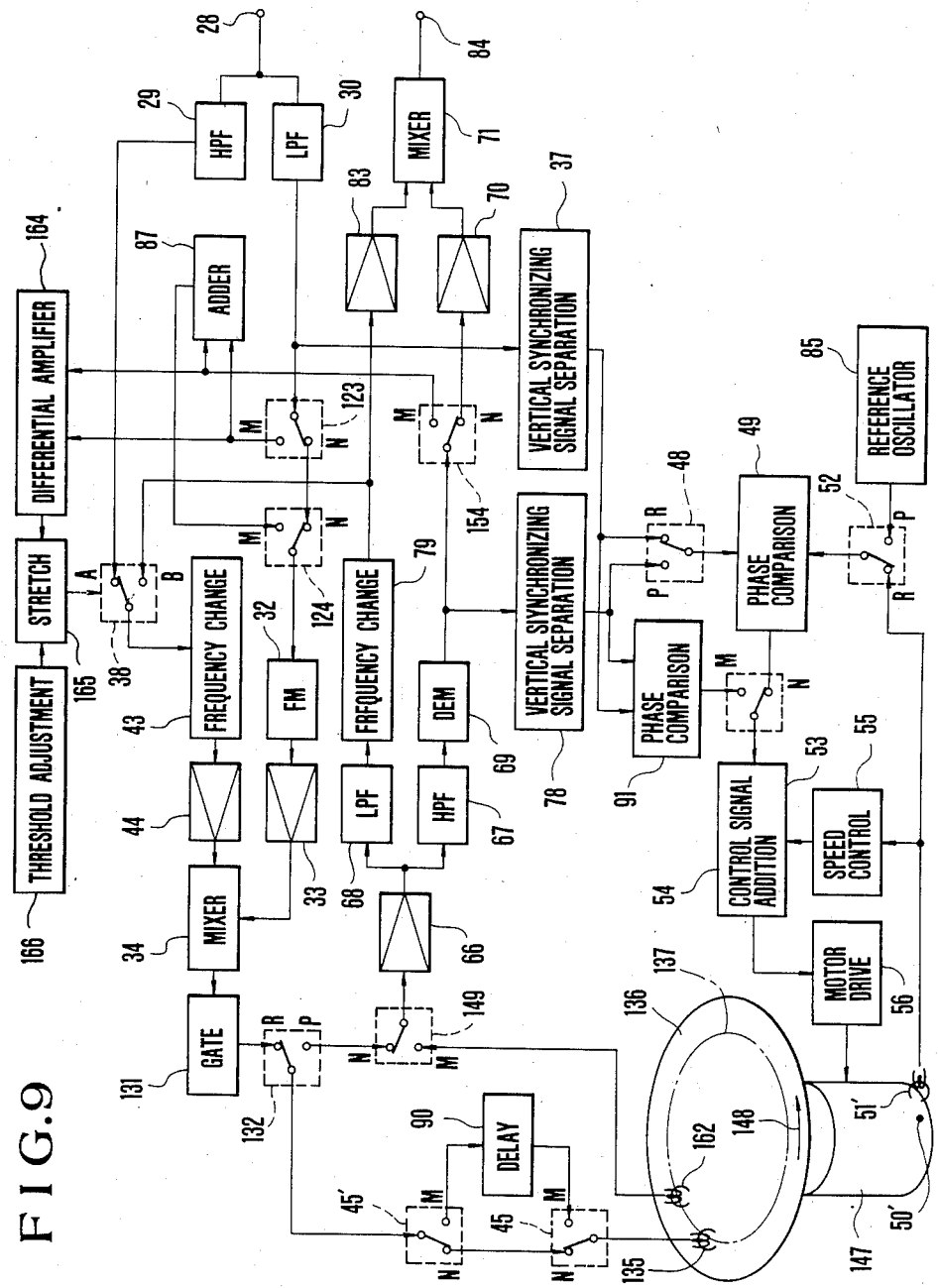

COLOR VIDEO SIGNAL MIXING SYSTEM

BACKGROUND OF THE INVENTION

1. Field of the Invention

This invention relates to a color video signal mixing system which mixes two color video signals to obtain a new mixed color video signal.

2. Description of the Prior Art

The conventional methods for mixing two color video signals include a simplified method which is carried out by directly adding color video signals in the form of television signals.

FIG. 1 of the accompanying drawings show a rotary head type video tape recorder (hereinafter called VTR) which is arranged to obtain a mixed color video signal in accordance with the above-stated simplified conventional mixing method and to record the mixed color video signal. The illustration of FIG. 1 includes a magnetic tape 1; a cylindrical tape guide drum which is arranged to have the tape 1 obliquely wound approximately 189° around it; a supply reel 3 for feeding the magnetic tape 1; and a take-up reel 4. The magnetic tape 1 is arranged to travel in the direction of an arrow 5 and the drum 2 in the direction of an arrow 6. The VTR includes heads 7 and 7' which are arranged for ordinary recording and reproducing operations and heads 8 and 8' which are arranged for recording a mixed color video signal. In ordinary recording, a color video signal received via an input terminal 10 is supplied via a selector switch 11 to a recording signal processing circuit 12. The circuit 12 processes the color video signal into a signal form suited for magnetic recording. The processed video signal is then supplied to the heads 7 and 7' via another selector switch 13. The heads 7 and 7' then record the video signal on the magnetic tape 1. In this instance, the switches 11 and 13 are respectively connected to their terminals R. In ordinary reproduction, switches 13 and 15 are respectively connected to their terminals P. A reproduced color signal obtained by the heads 7 and 7' is supplied via the switch 13 to a reproduced signal processing circuit 14. The circuit 14 then returns the reproduced color video signal back to the original signal form. Then, the thus processed reproduced signal is produced via an output terminal 16.

FIG. 2 shows the condition in which the signal is recorded on the magnetic tape 1 by the VTR shown in FIG. 1. One field portion of the color video signal is recorded within each of recording tracks 19A, 19B, 19C and 19D. Assuming that the signal is recorded in the track 19A by the head 7, the signal is recorded in the track 19B by the head 7' and then again in the track 19C by the head 7. Further, while the head 7 traces the track 19C in the position as shown in FIG. 2, the head 8 is in a position to trace the same part of the adjoining track 19D. The heads 7' and 8' are also arranged likewise relative to each other.

For recording a mixed color video signal with these heads 8 and 8', the VTR operates as follows: The switch 13 is shifted to the terminal P while switches 11 and 15 are respectively shifted to the terminals M. A color video signal which is reproduced by the heads 7 and 7' is supplied via the reproduced signal processing circuit 14 and the switch 15 to an adder 17 and is added to another video signal which is supplied via the terminal 10. In this instance, the servo rotation of the drum 2 is performed according to a vertical synchronizing signal separated from the video signal supplied via the terminal 10. By virtue of this arrangement, the reproduced video signal and a video signal coming via a terminal 16 coincide with each other. A mixed color video signal obtained at the adder 17 is changed by a recording signal processing circuit 18 into a video signal form suited for magnetic recording. After that, the mixed signal is recorded by the heads 8 and 8' on the tracks which adjoin the tracks being traced by the heads 7 and 7' and which have already been traced by the heads 7 and 7'. However, mixing color video signals in accordance with this method tends to create a moire of color or a change in hue. This problem of the prior art method results from difficulty in bringing the phase of one chroma signal into perfect agreement with that of the other. This is also because two added chroma signals being about a phase deviation or a hue deviation.

To solve this problem, it has been the practice, in TV broadcasting or the like, to mix two color video signals by switching them from one to the other according to the level of the luminance signal or the phase (hue) of one of the two color video signals.

However, in forming a signal for effecting the switch-over according to the luminance signal level, for example, a part of one of the color video signals which is to be left unmixed must be provided with a background of high luminance (white) or low luminance (black). This purpose may be attained during an image sensing operation by applying a spotlight on a desired object or by sensing the image with a white wall used as a background. However, such an arrangement is quite troublesome. Besides, since the video signal must be subjected to a switching operation, some part of the video signal that is discarded by switching eventually disappears in the mixed video signal thus obtained. Then it is hardly possible to attain an overlapped picture effect.

Further, in the event that one of the color video signals that is to be used for the preparation of the switching signal happens to be a signal close to the threshold value for switching control, each picture would include too many switching parts and thus its quality would be excessively degraded.

SUMMARY OF THE INVENTION

A general object of the present invention is therefore to provide a color video signal mixing system which obviates the shortcomings of the prior art mentioned above.

It is a specific object of the invention to provide a color video signal mixing system which is capable of giving a satisfactory mixed color video signal free from hue deviation despite of the simple structural arrangement thereof.

It is another object of the invention to provide a color video signal mixing system wherein a satisfactory mixed color video signal having no unseemliness due to switching can be obtained without requiring any special arrangement at the time of image sensing.

It is a further object of the invention to provide a system wherein while a color video signal is being reproduced from a recording medium, another color video signal is mixed therewith to obtain a satisfactory mixed color video signal for recording.

To attain these objects, a color video signal mixing system arranged according to the invention as a preferred embodiment thereof comprises:

First separating means which separates a first luminance signal from a first color video signal; second separating means which separates a first chrominance signal from the first color video signal; third separating means which separates a second luminance signal from a second color video signal; fourth separating means which separates a second chrominance signal from the second color video signal; first mixing means which obtains a mixed luminance signal from the first and second luminance signals; selecting means which obtains a selected chrominance signal by selecting one of the first and second chrominance signals; controlling means which controls the selecting action of the selecting means; and second mixing means which gives a mixed color video signal by mixing the above-stated mixed luminance signal and the above-stated selected chrominance signal.

These and further objects and features of the invention will become apparent from the following detailed description of preferred embodiments thereof taken in conjunction with the accompanying drawings.

BRIEF DESCRIPTION OF THE DRAWINGS

FIG. 5 is an illustration of a mixed color video signal obtained from the VTR of FIG. 3 as in a state of being reproduced in a picture by an image receiver or the like.

FIG. 7 is an illustration of a mixed color video signal obtained from the VTR of FIG. 6 as in a state of being reproduced in a picture by an image receiver or the like.

FIG. 9 is a block diagram showing a magnetic sheet type recording and reproducing system as a further embodiment of the invention.

DETAILED DESCRIPTION OF THE PREFERRED EMBODIMENTS

Figure 1:
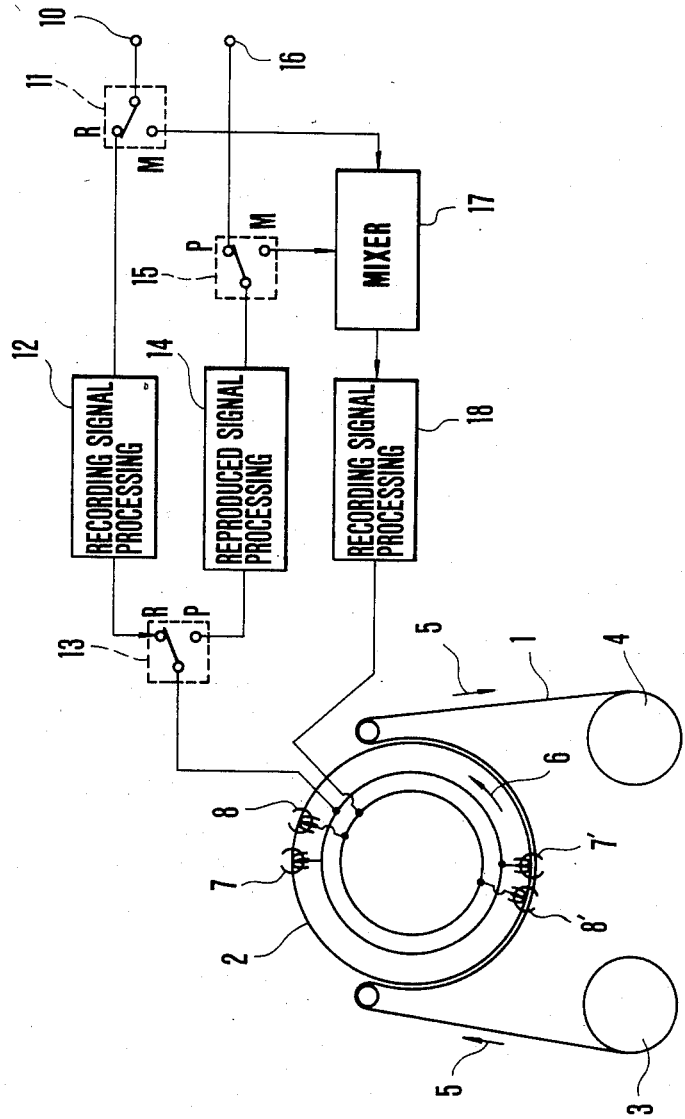
FIG. 1 is a schematic illustration of a VTR employing the conventional mixing method.
Figure 2:
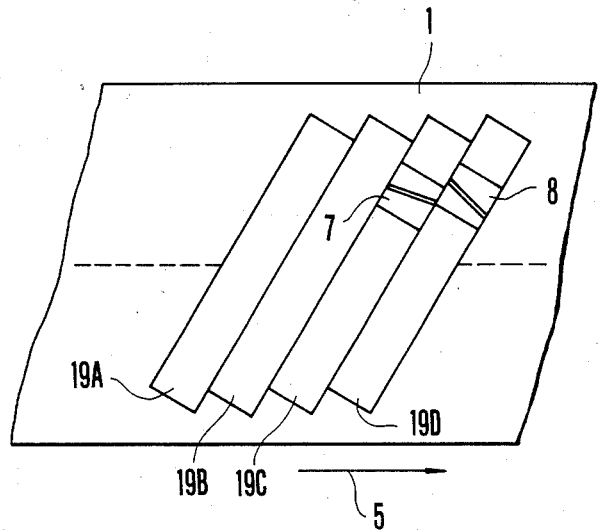
FIG. 2 is an illustration of the condition of a magnetic tape which has undergone a recording operation performed by the VTR shown in FIG. 1
Figure 4:
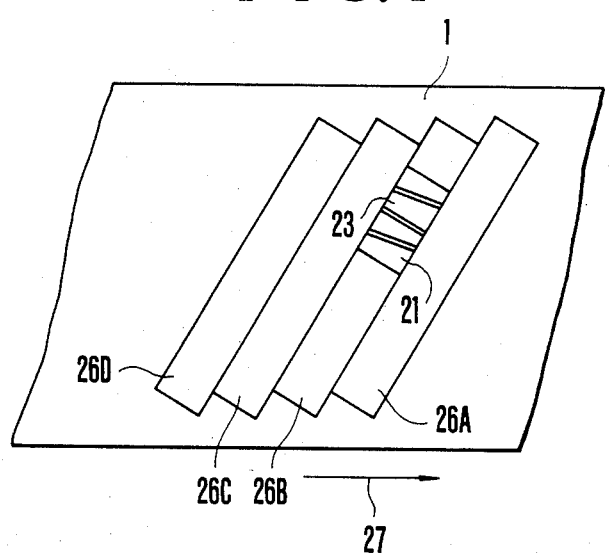
FIG. 4 is an illustration of the condition of a magnetic tape on which recording has been performed by the VTR of FIG. 3.
Figure 3:
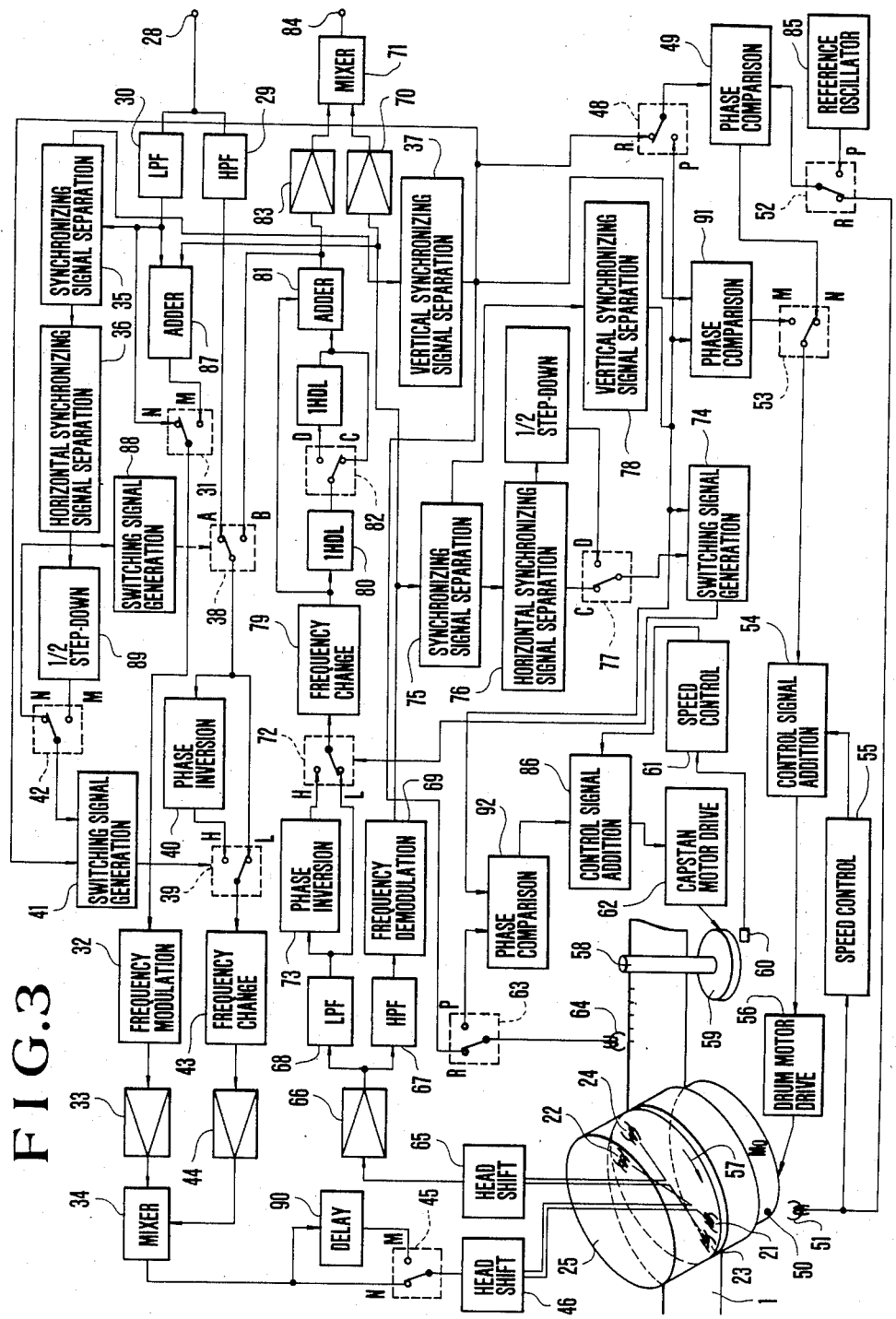
FIG. 3 is a block diagram showing a VTR as an embodiment of the present invention.

Referring to FIG. 3 which shows a VTR as an embodiment of the invention, the drawing includes recording heads 21 and 22 and reproducing heads 23 and 24. These heads 21, 22, 23 and 24 are secured to a rotary drum 25. FIG. 4 shows the condition of a magnetic tape 1 on which the VTR shown in FIG. 3 has performed a recording operation. Referring to FIG. 4, one field portion of a color video signal is recorded in each of tracks 26A, 26B, 26C and 26D. The recording heads 21 and 22 are arranged to record in these recording tracks in the order of the tracks 26A, 26B, 26C and 26D. The magnetic tape 1 is arranged to move in the direction of an arrow 27.

Assuming that the recording head 21 is in the position as shown in FIG. 4 to trace the track 26B, the head 23 which is positioned at the same azimuth angle as the head 21 traces the same track 26B ahead of the head 21. Upon completion of recording one field portion of a color video signal in the track 26B by the head 21, other heads 22 and 24 trace the next track 26C. The heads 22 and 24 are located at the same azimuth angle, which differs from that of the heads 21 and 23. The positional relation between the heads 22 and 24 are identical with the positional relation between the heads 21 and 23.

With the embodiment arranged in this manner, an ordinary recording operation is performed as follows: Again referring to FIG. 3, a terminal 28 is arranged to receive a color television signal. In this specific embodiment, the incoming color television signal is assumed to be an NTSC signal. The NTSC signal thus coming via the terminal 28 is supplied to a high-pass filter 29 (hereinafter will be called HPF) for separating a carrier chrominance signal and to a low-pass filter 30 (hereinafter called LPF) for separating a luminance signal.

The luminance signal which is separated by the LPF 30 is supplied via the terminal N of a switch 31 to a frequency modulator 32 for frequency modulation. The frequency modulated luminance signal is supplied to a mixer 34 via an amplification circuit 33. Further, the luminance signal separated by the LPF 30 is also supplied to a synchronizing signal separation circuit 35 to have a composite synchronizing signal separated therefrom. A horizontal synchronizing signal is separated from the composite synchronizing signal at a horizontal synchronizing signal separation circuit 36 and a vertical synchronizing signal from the composite signal at a vertical synchronizing signal separation circuit 37.

Meanwhile, the carrier chrominance signal separated by the HPF 29 is supplied via the terminal on the side A of a switch 38 to the terminal on the side L of a switch 39. Further, a signal obtained by phase inverting this carrier chrominance signal at a phase inversion circuit 40 is supplied to the terminal on the side H of the switch 39. The switch 39 is arranged to effect switch-over between the carrier chrominance signal which has passed through the phase inversion circuit 40 and the carrier chrominance signal which has not passed therethrough. The switching arrangement is such that the phases of the chrominance signals recorded in the adjoining recorded tracks on the magnetic tape 1 deviate 180° from each other for every horizontal scanning period (hereinafter called the period 1H). For example, the switch 39 is always connected to the terminal L for fields of odd numbers and to the terminal H for fields of even numbers in an alternating manner. This process is known as a PI recording process. The switching operation of the switch 39 is controlled by a switching signal generating circuit 41. The switching signal generating circuit 41 is arranged to receive a horizontal synchronizing signal which is separated by the horizontal synchronizing signal separation circuit 36 and comes via the terminal N of the switch 42 and a vertical synchronizing signal which is separated by a vertical synchronizing signal separation circuit 37.

The carrier chrominance signal which has been processed in this manner is frequency changed by a frequency changer 43 to a zone lower than that of the above-stated frequency modulated luminance signal and is supplied to the mixer 34 via an amplification circuit 44. At the mixer 34, the frequency modulated luminance signal and the chrominance signal changed to the lower frequency zone are mixed into a mixed signal. The mixed signal thus obtained is recorded on the magnetic tape by the recording heads 21 and 22 as a color video signal via the terminal on the side N of a switch 45 and a head shifting circuit 46. Although it is not shown, in the drawing, the head shifting circuit 46 is under the control of a vertical synchronizing signal separated from the incoming color video signal. In other words, the head shifting circuit 46 is controlled by the vertical synchronizing signal which is separated by a vertical synchronizing signal separation circuit 37.

For ordinary recording, the rotary head arrangement, i.e. the drum 25, is controlled as follows: The vertical synchronizing signal separated by the vertical synchronizing signal separation circuit 37 is supplied to a phase comparison circuit 49 via the terminal R of a switch 48. A magnet 50 generates pulses PG for detecting the rotational phase of the rotary drum 25; and a head 51 for generating the pulses PG. Each pulse PG obtained from the head 51 is supplied via the terminal R of a switch 52 to the phase comparison circuit 49. The circuit 49 produces a phase error output corresponding to a phase difference between the vertical synchronizing signal and the pulse PG. The phase error output of the circuit 49 is supplied via the terminal N of a switch 53 to a control signal addition circuit 54 to be added to a speed control obtained from a speed control circuit 55 on the basis of the pulse PG. The control signal addition circuit 54 thus produces a drum motor rotation control signal, which is then supplied to a drum motor drive circuit 56 to drive a drum motor in a controlled manner. A drum 25 is arranged to rotate at a constant speed which is 60 revolutions per second while phase control is performed to have the vertical synchronizing signal recorded in prescribed positions in the recording tracks 26A-26D shown in FIG. 4. The rotating direction of the drum 25 is as indicated by an arrow 57.

A capstan 58 is arranged to be driven by a capstan motor 59. The rotation of the capstan motor 59 is detected by a signal generator 60, which produces a signal FG. A speed control signal is obtained from a speed control circuit 61 on the basis of the signal FG. The capstan motor circuit 62 drives the motor according to this speed control signal so that the capstan can be rotated at a constant speed.

Meanwhile, the vertical synchronizing signal separated at the vertical synchronizing signal separation circuit 37 is supplied as a control signal via the terminal R of a switch 63 to a control head 64, which records this control signal on the edge portion of the magnetic tape 1.

An ordinary reproducing operation is performed as follows: In this instance, each of switches 48, 52 and 63 is connected to the terminal P. A reproduced signal obtained from the reproducing heads 23 and 24 is supplied via the head shifting circuit 65 to a pre-amplifier 66. The reproduced color video siganl which is amplified by the pre-amplifier 66 is then processed through an HPF 67 and an LPF 68 to have a frequency modulated luminance signal separated by the former and chrominance signal which is frequency changed to a low zone and is separated by the latter. The frequency modulated signal is frequency demodulated by a frequency demodulator 69 into a luminance signal of the original television signal form.

The reproduced luminance signal which has been thus brought back to the original television signal form is supplied to a mixer 71 via an amplification circuit 70. Meanwhile, the chrominance signal which has been frequency changed to the low zone must be returned to its original phase as it has been processed to have the 180° phase deviation for every period 1H between adjoining recording tracks. For this purpose a switch 72 selectively passes a signal from a phase inversion circuit 73 when at its terminal side H and passes a signal which does not come via the circuit 73 when at its terminal L. For example, in case that fields of odd numers are recorded at a predetermined phase while fields of even numbers are recorded at a predetermined phase inverted at the end of every period 1H, the reproduced signal portions for the fields of odd numbers are always taken from the terminal L and the reproduced chrominance signal portions for the fields of even numbers are alternately taken from the terminals L and H for every period 1H. The switching operation of the switch 72 is controlled by a switching signal generation circuit 74. A horizontal synchronizing signal which is obtained from the reproduced luminance signal via a synchronizing signal separation circuit 75, a horizontal synchronizing signal separation circuit 76 and the terminal C of a switch 77 and a vertical synchronizing signal which is obtained via the synchronizing signal separation circuit 75 and a vertical synchronizing signal separation circuit 78 are supplied to the switching signal generation circuit 74. The circuit 74 is arranged to produce a switching signal according to these synchronizing signals.

The low-frequency changed chrominance signal which has passed through the switch 72 is frequency changed back to its original frequency zone. The frequency changed chrominance signal is delayed for 1H by a 1H delay line 80 (hereinafter will be called the 1HDL). The 1-H delayed chrominance signal and the chrominance signal which has not been 1-H delayed are added up at an adder 81 in such a way as to have the cross-talk of chrominance signal from an adjoining track from the signal. A switch 82 is connected to the terminal C thereof under an ordinary reproducing condition. Therefore, the reproduced chrominance signal from which the cross-talk has been removed by the adder 81 is supplied via an amplification circuit 83 to a mixer 71 to be superposed on the reproduced luminance signal. The color television signal obtained from the mixer 71 is applied to the outside from a terminal 84. Further, the above-stated head shifting circuit 65 is arranged to be controlled by a reproduced vertical synchronizing signal separated by a vertical synchronizing signal separation circuit 78.

During an ordinary reproducing operation, the reproduced synchronizing signal separated by the vertical synchronizing signal separation circuit 78 is supplied to the phase comparison circuit 49 via the terminal P of the switch 48. The phase of the reproduced vertical synchronizing signal is compared by the phase comparison circuit 49 with that of a reference signal produced from a reference oscillator 85 via the terminal P of a switch 52. The phase comparison circuit 49 produces a phase control signal, which is subjected to an adding operation together with a speed control signal at a control signal addition circuit 54 in the same manner as in the case of ordinary recording. The rotation of the drum 25 is controlled via a drum motor drive circuit 56.

Next, the capstan 58 is controlled in the following manner: A speed control signal which is obtained from a speed control circuit 61 according to the signal FG obtained in the same manner as in recording is supplied to a control signal addition circuit 86. Further, the control signal which has been recorded on the edge portion of the magnetic tape 1 during the ordinary recording operation is reproduced by the control head 64. The reproduced control signal thus obtained is supplied via the terminal P of the switch 63 to a phase comparison circuit 92. At the phase comparison circuit 92, the phase of the reproduced control signal is compared with that of the vertical synchronizing signal separated from the reproduced luminance signal by the vertical synchronizing signal separation circuit 78. The output of the phase comparison circuit 92 is supplied as a phase control signal to a control signal addition circuit 86. At the control signal addition circuit 86, the speed control signal is added to the phase control signal. The output of this control signal addition circuit 86 is used to control the capstan motor drive circuit 62.

In recording a mixed color video signal, the VTR which is arranged as shown in FIG. 3 operates as follows: In this instance, each of switches 31, 42, 45 and 53 is connected to the terminal M thereof. A color video signal reproduced by the reproducing heads 23 and 24 is supplied via the head shifting circuit 65 to the reproduced signal processing circuit described in the foregoing. Then, a reproduced color television signal is obtained from the mixer 71. The head shifting circuit 65, in this instance, is under the control of the vertical synchronizing signal separated by the vertical synchronizing signal separation circuit 78 in the same manner as in an ordinary reproducing operation. A reproduced chrominance signal obtained at the adder 81 is supplied to the terminal B of the switch 38. A reproduced luminance signal which is obtained at the frequency demodulator 69 is supplied to the adder 87.

In the meantime, another color television signal is supplied to the terminal 28. A carrier chrominance signal separated via the HPF 29 from this television signal is supplied to the terminal on the side A of the switch 38. A luminance signal which is separated via the LPF 30 from this signal is supplied to the adder 87. At the adder 87, the new input luminance signal and the reproduced luminance signal are added up to obtain a mixed luminance signal. The mixed luminance signal thus obtained is supplied to the mixer 34 via the terminal M of the switch 31, the frequency modulator 32 and the amplification circuit 33. Meanwhile, the position of the switch 38 is shifted between the terminal A and the terminal B at the end of every horizontal scanning period 1H. A horizontal synchronizing signal which is separated by the horizontal synchronizing signal separation circuit 36 is supplied to a switching signal generating circuit 88. This results in obtaining a selected chrominance signal in a form such that the reproduced chrominance signal and the carrier chrominance signal are alternately taken from the switch 38 at the end of every horizontal scanning period 1H. This selected chrominance signal is subjected to the above-stated process of removing the cross-talk between adjoining recording tracks. In this instance, however, correlated signal portions of the selected chrominance signal appear repeatedly at the end of every 2H. Therefore, the phase of the chrominance signal must be arranged to deviate 180° at the end of every 2H. More specifically, for fields of odd numbers, the switch 39 is always connected to the terminal L. For fields of even numbers, the position of the switch must be alternately shifted between the terminals H and L of the switch at the end of every horizontal scanning periods 2H. Therefore, the number of the horizontal synchronizing signals to be supplied to the switching signal generating circuit 41 must be reduced to ½. In view of this, horizontal synchronizing signals are processed through a ½ step-down circuit 89 and are obtained via the terminal M of a switch 42.

The selected chrominance signal which has been processed in the above-stated manner is again frequency changed to a low zone by a frequency changer 43 and then is supplied to the mixer 34 via the amplification circuit 44. At the mixer 34, the selected chrominance signal and the mixed luminance signal are mixed into a mixed color video signal. The mixed color video signal thus obtained is delayed by a delay circuit 90 according to the phase difference between the reproducing heads 23 and 24. After the delaying process, the mixed color video signal is recorded by the recording heads 21 and 22 via the terminal M of the switch 45 and the head shifting circuit 46.

In recording the mixed color video signal, the drum 25 is controlled as follows: The phase control signal to be used in this instance is obtained by comparing at a phase comparison circuit 91 the phase of a reproduced vertical synchronizing signal which is separated from the reproduced luminance signal with the phase of a vertical synchronizing signal which is separated from the newly supplied color television signal. With the phase control signal obtained in this manner, the timing of the reproduced color television signal and that of the color television signal newly supplied are adjusted to each other. The output of the phase comparison circuit 91 is supplied to a control signal addition circuit 54 via the terminal M of a switch 53 and is subjected to an addition operation together with a speed control signal. The rotation of the drum 25 is then controlled by the output of the addition circuit 54.

The control over the capstan 58 is performed in the same manner as in the case of an ordinary reproducing operation and thus requires no further description. As for the control over the head shifting circuit 65, the circuit 65 is controlled by the vertical synchronizing signal separated from the television signal newly supplied. Meanwhile, the head shifting circuit 46 is controlled by a signal obtained either by a vertical synchronizing signal separated from the color video signal after it has been delayed via a delay circuit 90 or by a signal obtained by delaying the control signal of the head shifting circuit 65 to an extent corresponding to the delay time of the delay circuit 90.

Unlike the color video signal which is recorded by an ordinary recording operation to have correlativity at the end of every period 1H, the mixed color video signal which is recorded in the manner as described above has correlativity at the end of every periods 2H. Therefore, the process for removing the crosstalk between adjoining recording tracks differs from the process carried out for ordinary reproduction. In ordinary reproduction, a signal which is delayed by the 1HDL via the terminal C of the switch 82 is subjected to the adding operation of the adder 81. However, in reproducing the mixed color video signal, a signal which is delayed by two 1HDL's via the terminal D of the switch 82 is subjected to the adding operation.

Figure 5:
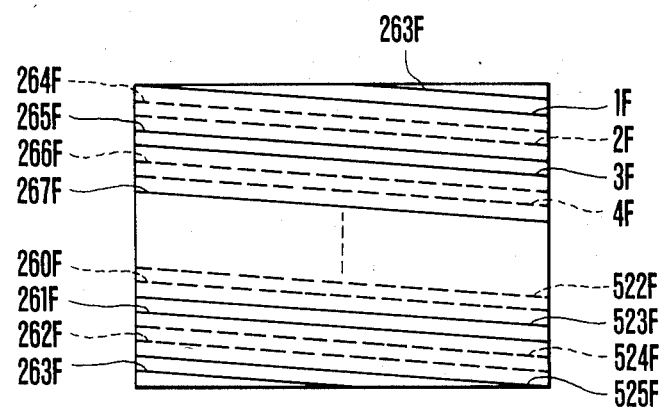

When the mixed color video signal obtained by the VTR of FIG. 3 is reproduced by a television receiver or the like, the condition of a picture thus obtained appears as shown in FIG. 5. Referring to FIG. 5, reference numerals 1F–263F denote the scanning lines of an odd number field while reference numerals 263F–525F denote the scanning lines of an even number field. Assuming that the full line represents a signal including the chrominance signal separated from the color video signal newly supplied, the broken line represents a signal including the chrominance signal separated from the reproduced color video signal. On the reproduced picture, as shown, at every period of 1/60 sec, scanning lines are produced with two adjacent lines reproducing the same chrominance signal contained in the mixed color video signal. This indicates that the VTR arranged according to the invention as shown in FIG. 3 is capable of giving a satisfactory mixed color video signal through use of a single unit of the VTR system without causing any color shading and hue deviation and without requiring any special technique for image sensing.

Figure 6:
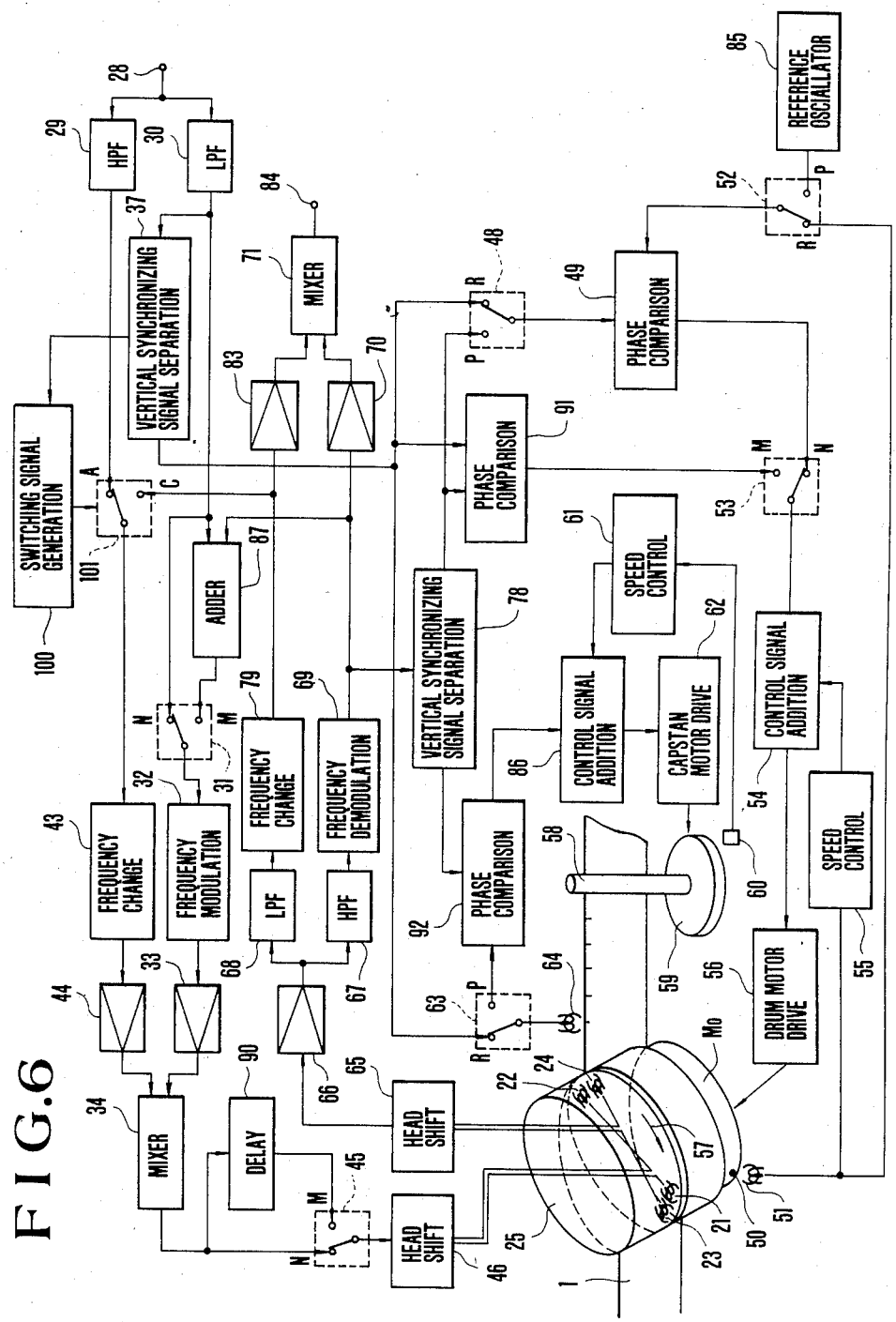
FIG. 6 is a block diagram showing a VTR as another embodiment of the invention.

FIG. 6 shows another embodiment of the invention. The component elements of the embodiment similar to those of the preceding embodiment example shown in FIG. 3 are indicated by the same reference numerals and details of them will be omitted from the following description. The ordinary recording and reproducing operations of the embodiment are similar to those of the preceding embodiment shown in FIG. 3 and therefore require no further description. Further, in the case of FIG. 6, the elements required for carrying out the process of removing the cross-talk between the adjoining recording tracks are omitted as the process is arranged to be carried out in the same manner as in the conventional VTR's.

In recording a mixed color video signal, the VTR shown in FIG. 6 operates as follows: The switches 31 and 45 are respectively connected to the terminals M in this instance. A color video signal reproduced by the reproducing heads 23 and 24 is processed via the head shifting circuit 65 in the same manner as in the case of FIG. 3. Through that process, a reproduced color television signal is produced from the mixer 71. In this instance, the control over the head shifting circuit 65 is performed by a vertical synchronizing signal separated by the vertical synchronizing signal separation circuit 78. A reproduced chrominance signal obtained from the frequency changer 79 is supplied to the terminal C of a switch 101. Meanwhile, a reproduced luminance signal obtained from the frequency demodulator 69 is supplied to the adder 87.

To the terminal 28 on the other hand is supplied a new color television signal. A carrier chrominance signal separated from this signal by the HPF 29 is supplied to the terminal A of the switch 101. A luminance signal separated from this new signal by the LPF 30 is supplied to the adder 87. At the adder 87, the reproduced luminance signal and the new input luminance signal are added up to obtain a mixed luminance signal. The mixed luminance signal is supplied to the mixer 34 via the terminal M of the switch 31, the frequency modulator 32 and the amplification circuit 33. A switching signal generating circuit 100 is arranged to shift the connecting position of the switch 36 between terminals A and C of the switch at the end of every vertical retrace line period. The circuit 100 produces the switching signal in response to a vertical synchronizing signal which is separated at the vertical synchronizing signal separation circuit 37. As a result of this arrangement, the switch 101 produces a selected chrominance signal consisting of the reproduced chrominance signal and the newly supplied carrier chrominance signal which are alternately taken out at the end of every field.

The selected chrominance signal which has been thus processed is again changed to a low frequency zone by the frequency changer 43 and is then supplied via the amplification circuit 44 to the mixer 34. The mixer 34 mixes the selected chrominance signal and the mixed luminance signal together to produce a mixed color video signal. The mixed color video signal which is obtained in this manner is delayed by the dealy circuit 90 in accordance with a phase difference between the recording heads 21 and 22. After that, the delayed mixed color video signal is supplied to the recording heads via the terminal M of the switch 45 and the head shifting circuit 46 and is recorded by the heads 21 and 22.

Figure 7:
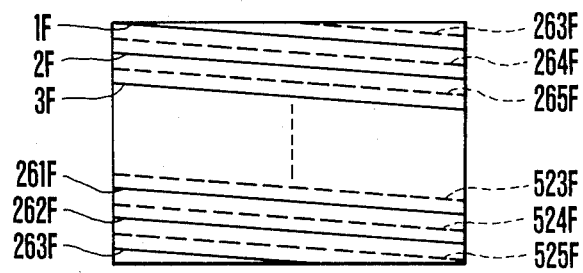

When the mixed color video signal obtained by the VTR of FIG. 6 is reproduced by a television receiver or the like, the condition of the picture thus obtained becomes as shown in FIG. 7. Referring to FIG. 7, reference numerals 1F–263F denote the scanning lines of an odd number field. Reference numerals 263F–525F denote the scanning lines of an even number field. Assuming that the full line represents a signal containing the chrominance signal which is separated from the newly supplied color video signal, the broken line represents a signal containing the chrominance signal which is separated from the reproduced color video signal. On the reproduced picture, as shown, colors obtained from the two different chrominance signals appear in adjacent scanning lines at the end of every 1/60 sec. As apparent from the above description, the VTR shown in FIG. 6 gives the same effect as that of the VTR shown in FIG. 3.

Figure 8:
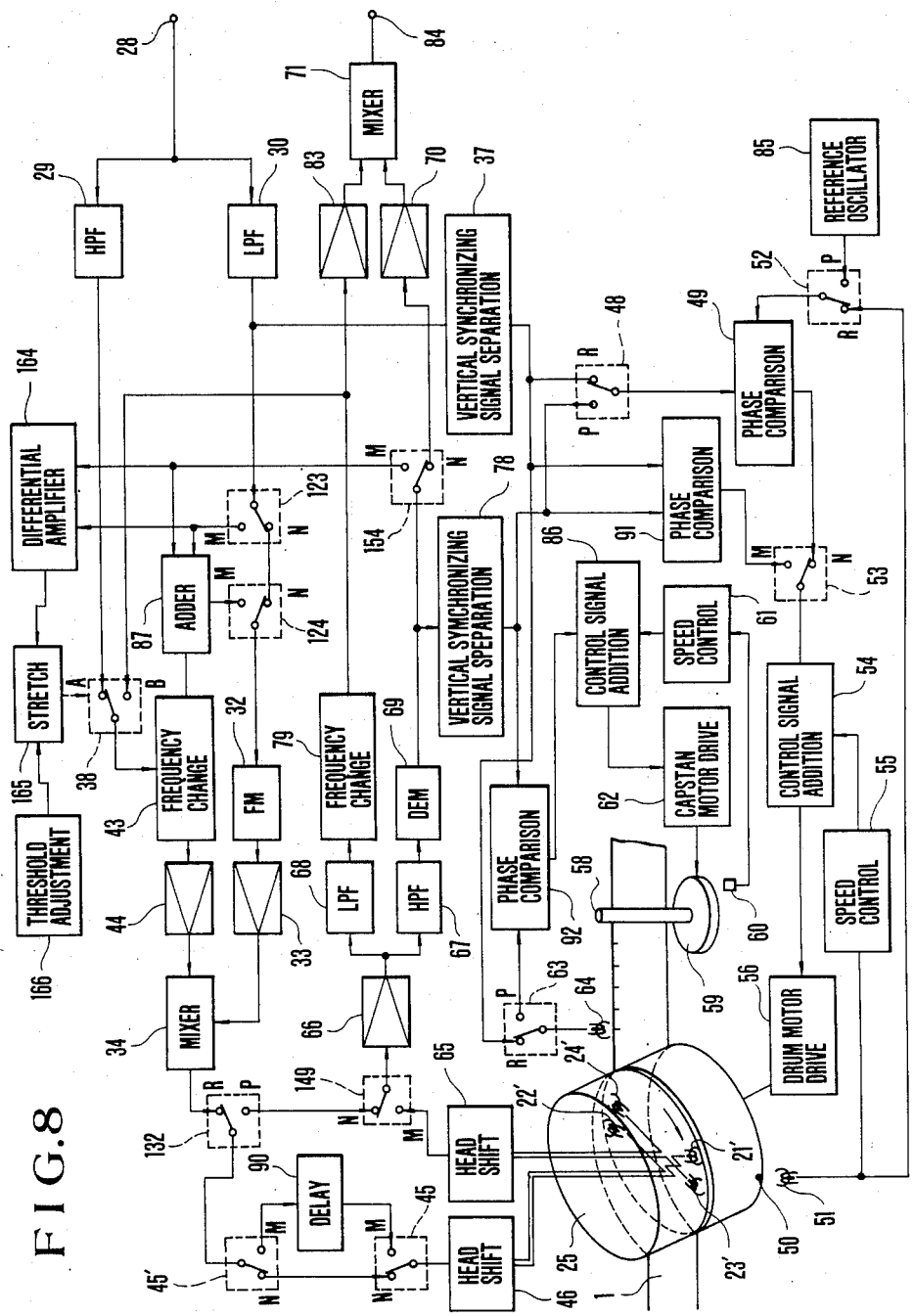
FIG. 8 is a block diagram showing a VTR as a further embodiment of the invention.

FIG. 8 shows a VTR as further embodiment of the invention. The components similar to those shown in FIG. 3 are indicated by the same reference numerals and the details of them are omitted from the following description. The embodiment is provided with ordinary recording/reproducing heads 21' and 22' and heads 23' and 24' which are arranged to be used for reproduction only when a mixed color video signal is recorded. These heads are arranged in the same manner as the heads 21, 22, 23 and 24 of FIG. 3. The operation of the servo system is also the same and requires no further description.

In ordinary recording, switches 123 and 124 are both connected to their terminals N thereof. A switch 132 is connected to the terminal on the side R thereof. The signal processing operation is similar to the VTR shown in FIG. 3. In carrying out ordinary reproduction, a video signal reproduced by the heads 21' and 22' is supplied to a reproducing amplifier 66 via the terminal on the side P of the switch 132 and the terminal N of a switch 149. Further, a switch 154 is connected to the terminal N thereof and the signal processing operation is performed in the same manner as in the case of VTR shown in FIG. 3.

In obtaining a mixed color video signal, the embodiment operates as follows: The heads 23' and 24' are auxiliary heads to be used only for reproduction. They are arranged to scan the magnetic tape 1 ahead of the heads 21' and 22'. A color video signal reproduced by the heads 23' and 24' is supplied to the circuit of a reproduced signal processing system via a head shifting circuit 65 and the terminal M of the switch 149. The head shifting circuit 65 is under the control of a vertical synchronizing signal separated from the color video signal which is reproduced by the heads 23' and 24'. In other words, the circuit 65 is controlled by the vertical synchronizing signal which is separated by a vertical synchronizing signal separation circuit 78. Meanwhile, a color television signal to be mixed with this reproduced color video signal is supplied via an input terminal 28. The color video signal supplied via the terminal 28 is supplied to an HPF 29 and an LPF 30. A carrier chrominance signal is separated by the HPF 29 and a luminance signal by the LPF 22. The separated luminance signal is supplied via the terminal M of a switch 123 to an adder 87 and a differential amplifier 164. The carrier chrominance signal separated by the HPF 29 is supplied to the terminal A of a switch 38. The differential amplifier 164 produces a signal of a level proportional to the difference between the luminance signal level of the color video signal reproduced from the magnetic tape 1 and that of the color video signal supplied via the terminal 28. The signal from the differential amplifier 164 is supplied to a stretch circuit 165. The stretch circuit 165 shifts the connecting position of the switch 28 which is always connected to the terminal A for ordinary recording either to the terminal A or another terminal B according to the output of the differential amplifier 164.

Generally, in obtaining a mixed color picture, the color of one of the two color video signals that has a higher luminance signal level at many parts of the picture is more important than the other. The presentability of the picture can be improved by producing the color of the video signal having the higher luminance signal level. In view of this, the reproduced video signal and the newly supplied video signal are compared for luminance signal level at each part of the picture by means of the output of the differential amplifier 164. After the comparison, the chrominance signal of the video signal of a higher luminance signal level is produced from the stretch circuit 165 with the switching position of the switch 38 shifted accordingly. For example, in the case of the system shown in FIG. 3, the switch 38 is shifted to the terminal B when the luminance signal level of the reproduced video signal is higher and to the terminal A when the luminance signal level of the supplied video signal is higher. The embodiment is further provided with a threshold adjustment circuit 166 for adjusting the threshold level of the stretch circuit 165. For example, assuming that the luminance signal of the reproduced video signal is the positive input to the differential amplifier 164 and that of the newly supplied video signal is the negative input to the amplifier 164, in the case of the above-stated example, the threshold level is adjusted to a zero level. Then, the threshold level is adjusted to a negative level if the chrominance signal of the reproduced video signal is considered to be more important and to a positive level if the chrominance level of the newly supplied video signal is more important. With the threshold level adjusted in this manner, the chrominance signal of the color video signal which is considered more important is produced in a larger degree.

A color burst signal is superposed on the back porch of the horizontal synchronizing signal. Therefore, the luminance signal level of this part is at a zero level both in the reproduced video signal and the newly supplied video signal. This arrangement of this system, therefore, with the threshold level adjusted to a positive or negative level by the threshold adjustment circuit 166 produces, the color burst signal contained either in the reproduced video signal or in the newly supplied video signal. Other conceivable methods, though they are not included in the accompanying drawings, include a method of superposing the average value of two color burst signals which result from phase deviation, etc. although they are intrinsically one and the same; and another method of using the color burst signal of the reproduced video signal or the newly supplied video signal whichever has a chrominance signal produced over a longer period of time.

The selected chrominance signal which is thus obtained is again frequency changed to a lower zone by a frequency changer 43 and then is supplied via an amplifier 44 to a mixer 34. Meanwhile, the luminance signal of the newly supplied video signal and that of the reproduced video signal are added up by an adder 87. A luminance signal thus produced from the adder 87 is supplied via the terminal M of a switch 124 to a frequency modulator 32 and is subjected to frequency modulation and a related process. The luminance signal thus processed by the frequency modulator 32 is supplied via an amplifier 33 to the mixer 34. Then, the mixer 34 produces a mixed video signal. The mixed video signal thus obtained is recorded on the magnetic tape 1 via the terminal R of a switch 132, the terminal M of a switch 45', a delay circuit 90 and the terminal M of a switch 45. The mixed color video signal is recorded in the same position as the color video signal which has been recorded in the same manner as in other embodiments shown in FIGS. 3 and 6.

FIG. 9 shows a magnetic sheet type recording/reproducing apparatus as a still further embodiment example of the present invention. In this case, a color video signal corresponding to each field portion of a television signal is recorded in concentric circular recording tracks on a rotating magnetic sheet and the magnetic recording/reproducing apparatus is used for reproducing the recorded signal from the recording tracks. In FIG. 9, the same component elements as those shown in FIG. 8 are indicated by the same reference numerals. In recording one field portion (a portion for 1/60 sec) of a video signal obtained from a mixer 34 is extracted at a gate circuit 131. The extracted portion of the video signal is supplied via the terminal R of a switch 132 and the terminals N of switches 45 and 45' to a recording-/reproducing head 135. The head 135 records the video signal on the magnetic sheet 136 forming concentric circular recording tracks 137.

Further, in this instance, a vertical synchronizing signal is extracted at a vertical synchronizing signal separation circuit 37 from a luminance signal produced from an LPF 30. The vertical synchronizing signal thus obtained is supplied via the terminal R of a switch 48 to a phase comparison circuit 49. The embodiment includes a magnet 50' which is arranged to produce pulses for detecting the phase of a motor 147; and a phase detecting head 51'. The pulse obtained from the head 51' is supplied via the terminal R of a switch 52 to the phase comparison circuit 49. The circuit 49 produces a signal corresponding to a phase difference between the phase of the vertical synchronizing signal and the phase detecting pulse. The signal of the circuit 49 is supplied via the terminal N of a switch 53 to a control signal addition circuit 54. The addition circuit 54 adds the phase difference signal from the circuit 49 to a speed control signal which is obtained by a speed control circuit 55 on the basis of the phase detecting pulse. The control signal addition circuit 54 then produces a motor rotation control signal, which is supplied to a motor drive circuit 36 to have the motor 147 driven in a controlled manner. The phase control is accomplished in such a manner that the vertical synchronizing signal is recorded at a predetermined point on the magnetic sheet 136 and the sheet 136 is rotated at a constant speed of 60 revolutions per sec. The rotating direction of the magnetic sheet 136 is shown by an arrow 148.

The ordinary reproducing operation of the magnetic recording/reproducing apparatus of FIG. 9 is as follows: In this instance, switches 48, 52 and 132 are respectively connected to their terminals P. One field portion of a color video signal continuously reproduced by the recording/reproducing head 135 is supplied to a pre-amplifier 66 via the terminals N of switches 45 and 45', the terminal P of the switch 132 and the terminal N of a switch 149. The reproduced color video signal thus amplified by the pre-amplifier 66 is then processed to have a frequency modulated luminance signal separated therefrom by an HPF 67 and a low zone converted chrominance signal separated therefrom by an LPF 68. The frequency modulated luminance signal is frequency demodulated by a frequency demodulator 53 and at the same time is processed to bring it into the form of a television signal. In other words, to eliminate disturbance of a horizontal synchronizing signal due to repeated reproduction of the same field portion of the video signal, a signal which has passed through a ½ horizontal scanning-period delay line (hereinafter called the ½ HDL line) and another signal which has not passed the ½ HDL line are alternately produced at the end of every field period. However, this process is not applicable to the vertical synchronizing signal, which is always produced without passing through the ½ HDL line.

The reproduced luminance signal which has been processed into the form of a television signal is supplied via terminal N of a switch 154 and an amplification circuit 70 to a mixer 71. Meanwhile, the low zone converted chrominance signal separated by the LPF 68 is changed back to the original frequency zone thereof by a frequency changer 79 and then is processed into the form of a television signal in the same manner as mentioned in the foregoing. A reproduced chrominance signal which is thus obtained is supplied via an amplification circuit 83 to the mixer 71. At the mixer 71, the reproduced chrominance signal is mixed with the reproduced luminance signal which is obtained via the amplification circuit 70. As a result of this mixing, a reproduced color television is produced from an output terminal 84.

In an ordinary reproducing operation, a reproduced vertical synchronizing signal separated by a vertical synchronizing signal separation circuit 78 from a reproduced luminance signal which is produced from a frequency demodulator 69 is supplied via the terminal P of a switch 48 to a phase comparison circuit 49. The phase of the reproduced vertical synchronizing signal is compared with that of a reference signal which is produced from a reference oscillator 85 and comes via the terminal P of a switch 52. As a result of this comparison, the phase comparison circuit 49 produces a phase control signal. The phase control signal and a speed control signal are added up at the control signal addition circuit 54 in the same manner as in the case of the ordinary recording operation. The rotation of the motor 147 is controlled by the output of the control signal addition circuit 54 via the motor drive circuit 36.

In obtaining a mixed color video signal, the magnetic recording/reproducing apparatus of this embodiment example operates in the same manner as in the case of the VTR shown in FIG. 8. A mixed color video signal obtained at the mixer 34 is supplied to a gate circuit 131. The gate circuit 131 extracts one field portion of the mixed color video signal. The extracted portion of the mixed color video signal is supplied via a delay circuit 90 to the head 135 to be recorded thereby.

In the magnetic recording/reproducing apparatus which is arranged as described above, two color video signals are mixed to obtain a satisfactory still color video signal.

Figure 10:
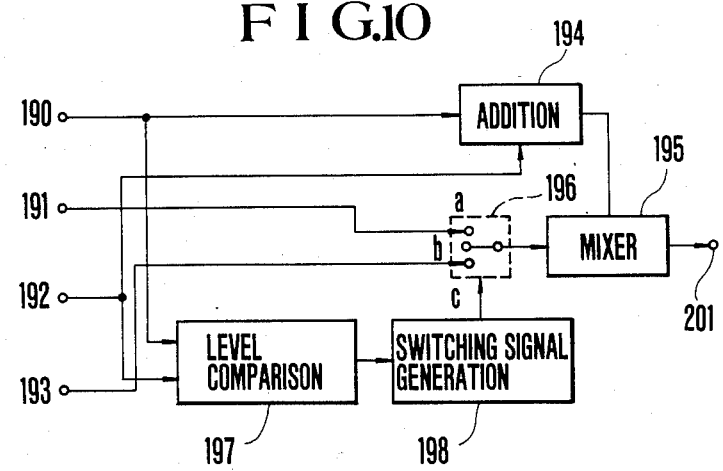
FIG. 10 is a block diagram showing the essential parts of the invented system as a still further embodiment example of the invention.

FIG. 10 shows the essential parts of a color video signal mixing system as a still further embodiment example of embodiment shown in FIGS. 3, 6, 8 and 9, the whole color video signal recording/reproducing arrangement is described. However, for simplification's sake, FIG. 10 includes the arrangement of only the parts required for mixing. A first luminance signal separated from a first color video signal is arranged to be supplied to a terminal 190. A first chrominance signal separated from the first color video signal is arranged to be supplied to a terminal 191. A second luminance signal separated from a second color video signal is arranged to be supplied to a terminal 192. A second chrominance signal separated from the second color video signal is arranged to be supplied to another terminal 193.

The first and second luminance signals are respectively supplied to an adder 194 to obtain a mixed luminance signal. The mixed luminance signal is supplied to a mixer 195. In such a case, it may seem that mixing one luminance signal of an intermediate level (corresponding to a gray color) with another luminance signal of an intermediate level gives a luminance signal of a high level. Generally, however, a video signal handling system of this type is provided with an automatic gain control circuit. Therefore, the adding operation results in a mixed luminance signal of a level which is close to an average level of the two luminance signals.

Meanwhile, the first and second chrominance signals are supplied to a terminal a and another terminal c of a switch 196 respectively. The first and second luminance signals are further supplied respectively to a level comparison circuit 197 for level comparison. The output of the level comparison circuit 197 is supplied to a switching signal generating circuit 198. The circuit produces, in response to the output of the level comparison circuit 197, a switching signal which shifts the connecting position of the switch 196.

Figure 11A:
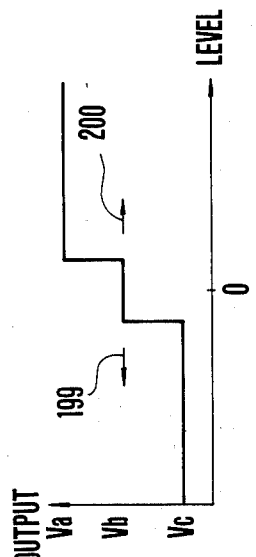
FIGS. 11(A)–11(D) are graphs showing by way of example the input and output characteristics of a switching signal generating circuit.

FIGS. 11(A)–11(D) show the input and output characteristics of the above-stated switching signal generating circuit 198. The characteristic shown in FIG. 11(A) is as follows: When the level of the first luminance signal is higher than that of the second luminance signal, i.e. when the output of the level comparison circuit 197 is a positive output, the switching signal generating circuit 198 produces an output Va which connects the switch 196 to its terminal a. Conversely, when the second luminance signal is at a higher level than the first luminance signal, the circuit 198 produces an output Vc which connects the switch 196 to its terminal C. This characteristic results from the consideration that between the two color video signals, the color of the one that has a higher luminance signal is more important than that of the other. The results obtainable from this arrangement is similar to the results obtainable from other embodiments shown in FIGS. 8 and 9. Further, as described with reference to FIGS. 8 and 9, it is also possible to attach importance to either the first or second color video signal. Where importance is attached to the first color video signal, the characteristic of the switching signal generating circuit 198 shown in FIG. 11(A) is shifted in the direction of arrow 199. Conversely, if importance is attached to the second color video signal, the characteristic is shifted in the direction of arrow 200.

Figure 11B:
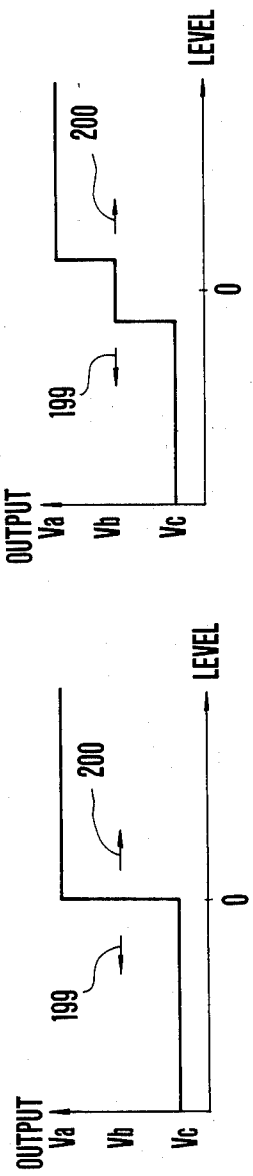

The characteristic shown in FIG. 11(B) arises because, when there is almost no difference between the levels of the first and second luminance signals, natural colors are hardly obtainable by producing any chrominance signal. In other words, if there is some degree of level difference, the switch 196 is connected either to the terminal a or the terminal c to have either the first or the second chrominance signal mixed by the mixer with the above-stated mixed luminance signal. However, if the level difference is small, the switch 196 is connected to its terminal b to allow neither the first nor the second chrominance signal to be supplied to the mixer 195. In that instance, a white-and-black signal is obtained for that portion.

Figure 11C:
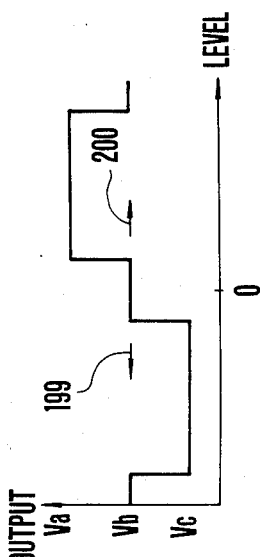
Figure 11D:
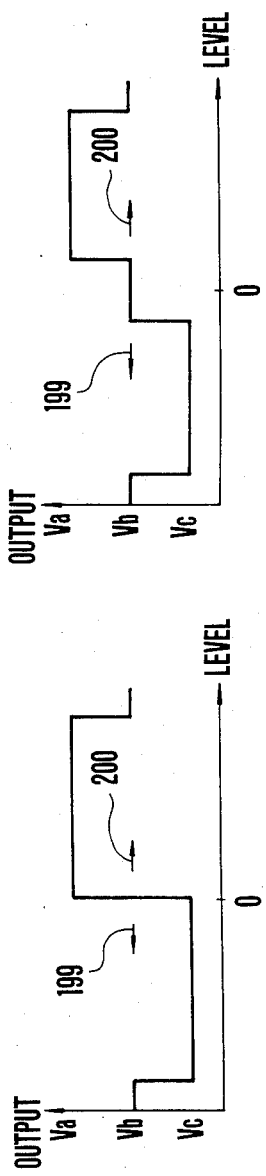

The characteristics shown in FIGS. 11(C) and (D) apply to a case where, if there is an excessively great difference between the level of the first luminance signal and that of the second luminance signal, no chrominance signal will be superposed. In each of the characteristics shown in FIGS. 11(B), (C) and (D), importance also can be attached either to the first or the second video signal with the characteristics shifted in the direction of arrow 199 or 200 in the same manner as in the case of FIG. 11(A).

In obtaining a mixed color video signal with the embodiment arranged as shown in FIGS. 10 and 11(A), (B), (C) and (D), the embodiment is also capable of giving a satisfactory mixed color video signal with simple arrangement without causing any uneven colors or color shading and any hue deviation as only one of the chrominance signals is superposed. Further, unlike the conventional arrangement, the embodiment obviates the necessity of applying a special process to one of the color video signals. In accordance with the arrangement of the embodiment, therefore, a satisfactory mixed color video signal can be obtained irrespective of the color video signals to be mixed.

In the foregoing description of embodiments, the details of the recording signal processing circuit and the reproduced signal processing circuit are omitted to a great extent for the sake of simplification of the description. For example, many known circuits used in a VTR such as a clamping circuit, an automatic gain control circuit, a clipping circuit, an automatic phase control circuit, etc. are omitted from description as they do not relate directly to the invention.

It is to be understood that the invention is not limited to the forms of signals and the recording method of the recording/reproducing arrangement, etc. employed in the embodiments described and that various changes and modifications may be resorted to without departing from the spirit and the scope of the invention as hereinafter claimed.

What we claim is:

1. A color video signal mixing system, comprising:
    (a) receiving means for receiving a first color video signal and a second color video signal at the same time, the first color video signal and the second color video signal each having an image information different from each other;
    (b) first separating means for separating a first luminance signal from the first color video signal;
    (c) second separating means for separating a first chrominance signal from the first color video signal;
    (d) third separating means for separating a second luminance signal from the second color video signal;
    (e) fourth separating means for separating a second chrominance signal from the second color video signal;
    (f) first mixing means for mixing the first and second luminance signals to obtain a mixed luminance signal;
    (g) selecting means for selecting one of the first and second chrominance signals to obtain a selected chrominance signal;
    (h) control means for controlling the selecting action of the selecting means; and
    (i) second mixing means for mixing said mixed luminance signal and said selected chrominance signal to give a mixed color video signal.

2. A system according to claim 1, further comprising means operative for synchronizing said first color video signal with said second color video signal.

3. A system according to claim 2, wherein said control means includes a control signal generating circuit for producing a control signal which controls the selecting action of said selecting means on the basis of the horizontal synchronizing signal of said first color video signal.

4. A system according to claim 3, wherein said selecting means is arranged to make a selection for every horizontal scanning period between the first chrominance signal and the second chrominance signal according to said control signal.

5. A system according to claim 2, wherein said control means includes a control signal generating circuit to produce, on the basis of the vertical synchronizing signal of said first color video signal, a control signal for controlling the selecting action of said selecting means.

6. A system according to claim 5, wherein said selecting means is arranged to make the selection of the chrominance signal for every vertical scanning period between the first and second chrominance signals according to said control signal.

7. A system according to claim 6, wherein said first color video signal and said second color video signal are arranged to form one frame with two fields.

8. A system according to claim 2, wherein said control means includes a comparison circuit for comparing the level of said first luminance signal with that of said second luminance signal; and said control means is arranged to control the selecting action of said selecting means according to the output of said comparison circuit.

9. A system according to claim 8, wherein said selecting means is arranged to select said first chrominance signal according to the output of said comparison circuit when the level of the first luminance signal is higher than that of the second luminance signal.

10. A system according to claim 9, wherein said selecting means is arranged to select said first chrominance signal according to the output of said comparison circuit when the level of the second luminance signal is higher than that of the first luminance signal.

11. A color video signal mixing system, comprising:
    (a) receiving means for receiving a first color video signal and a second color video signal at the same time, the first color video signal and the second color video signal each having an image information different from each other;

(b) first separating means for separating a first luminance signal from the first color video signal;

(c) second separating means for separating a first chrominance signal from said first color video signal;

(d) third separating means for separating a second luminance signal from the second color video signal;

(e) fourth separating means for separating a second chrominance signal from said second color video signal;

(f) first mixing means for mixing said first luminance signal and said second luminance signal to obtain a mixed luminance signal;

(g) second mixing means for selectively mixing said first chrominance signal with said mixed luminance signal; and (h) third mixing means for selectively mixing said second chrominance signal with said mixed luminance signal.

12. A system according to claim 11, wherein said first mixing means and said second mixing means are arranged to operate according to the level of said first luminance signal and that of said second luminance signal.

13. A system according to claim 12, wherein said first mixing means mixes said first chrominance signal with said mixed luminance signal when the level of said first luminance signal is higher than that of said second luminance signal by more than a predetermined level.

14. A system according to claim 13, wherein said second mixing means mixes said second chrominance signal with said mixed luminance signal when the level of said second luminance signal is higher than that of said first luminance signal by more than said predetermined level.

15. A system according to claim 12, wherein said first mixing means mixes said first chrominance signal with said mixed luminance signal when the level of said first luminance signal is higher, by a first predetermined voltage, than the level of said second luminance signal and the level difference between the first and second luminance signals is not exceeding a second predetermined voltage.

16. A system according to claim 15, wherein said second mixing means mixes said second chrominance signal with said mixed luminance signal when the level of said second luminance signal is higher, by said first predetermined voltage, than that of said first luminance signal and the level difference between the second and first luminance signals is not exceeding said second predetermined voltage.

17. A mixed color video signal recording apparatus, comprising:

(a) reproducing means for reproducing a first color video signal recorded on a recording medium;

(b) means for receiving a second color video signal having an image information different from that of the first video signal when said reproducing means is reproducing the first color video signal;

(c) means operative for synchronizing said first color video signal with second color video signal;

(d) first separating means for separating a first luminance signal from said first color video signal;

(e) second separating means for separating a first chrominance signal from said first color video signal;

(f) third separating means for separating a second luminance signal from said second color video signal;

(g) fourth separating means for separating a second chrominance signal from said second color video signal;

(h) first mixing means for mixing said first and second luminance signals to obtain a mixed luminance signal;

(i) selecting means for selecting one of said first and second chrominance signals to obtain a selected chrominance signal;

(j) control means for controlling the selecting action of said selecting means;

(k) second mixing means for mixing said mixed luminance signal with said selected chrominance signal to obtain a mixed color video signal; and (l) means for recording said mixed color video signal on said recording medium.

18. An apparatus according to claim 17, further comprising:

positioning means for making the position in which said first color video signal has been recorded on said recording medium coincide with the position in which said mixed color video signal is to be recorded on said recording medium by said recording means.

19. An apparatus according to claim 18, wherein said positioning means includes a delay circuit for determining a delay time according to the positions of said reproducing means and recording means.

20. A color video signal mixing system, comprising:

(a) receiving means for receiving a plurality of color video signals at the same time, the plurality of color video signal each having an image information different from each other;

(b) first separating means for separating a plurality of luminance signals from said plurality of color video signals respectively;

(c) second separating means for separating a plurality of chrominance signals from said plurality of information signals respectively;

(d) first mixing means for mixing said plurality of luminance signals to obtain a mixed luminance signal;

(e) second mixing means for selectively mixing said plurality of chrominance signals with said mixed luminance signal; and (f) control means for controlling the mixing action of said second mixing means.

21. A color video signal mixing system, comprising:

(a) receiving means for receiving a plurality of color video signals at the same time, the plurality of color video signals each having an image information different from each other;

(b) separating means for separating a plurality of chrominance signals from the plurality of color video signals respectively;

(c) selecting means for selecting one chrominance signal from said plurality of chrominance signals to obtain a selected chrominance signal; and (d) control means for controlling the selecting action of said selecting means.

* * * * *